W. M. METZLER.
CORE STRIPPER FOR PNEUMATIC TIRES.
APPLICATION FILED SEPT. 4, 1920.

1,363,802.

Patented Dec. 28, 1920.

William M. Metzler

UNITED STATES PATENT OFFICE.

WILLIAM M. METZLER, OF AKRON, OHIO, ASSIGNOR TO THE GOODYEAR TIRE & RUBBER COMPANY, OF AKRON, OHIO, A CORPORATION OF OHIO.

CORE-STRIPPER FOR PNEUMATIC TIRES.

1,363,802.  Specification of Letters Patent.  Patented Dec. 28, 1920.

Application filed September 4, 1920. Serial No. 408,143.

*To all whom it may concern:*

Be it known that I, WILLIAM M. METZLER, a citizen of the United States, residing at Akron, in the county of Summit and State of Ohio, have invented new and useful Improvements in Core-Strippers for Pneumatic Tires, of which the following is a specification.

My invention relates to core stripping devices used in the manufacture of pneumatic tires, and more particularly to mechanical devices for removing cores from pneumatic tires upon which they are formed.

It is well known to those familiar with the art that pneumatic tire casings are formed upon cores which are quite heavy and, consequently, somewhat difficult to remove from the finished carcass.

The broad object of my invention is to provide a mechanical device which shall materially facilitate the removal of the core from the casing formed thereon.

Other and ancillary objects will be apparent from the following detailed description of the accompanying drawings which form a part of this specification.

In the drawings, Figure 1 is a plan view of a core stripper constructed in accordance with my invention.

Figure 1:
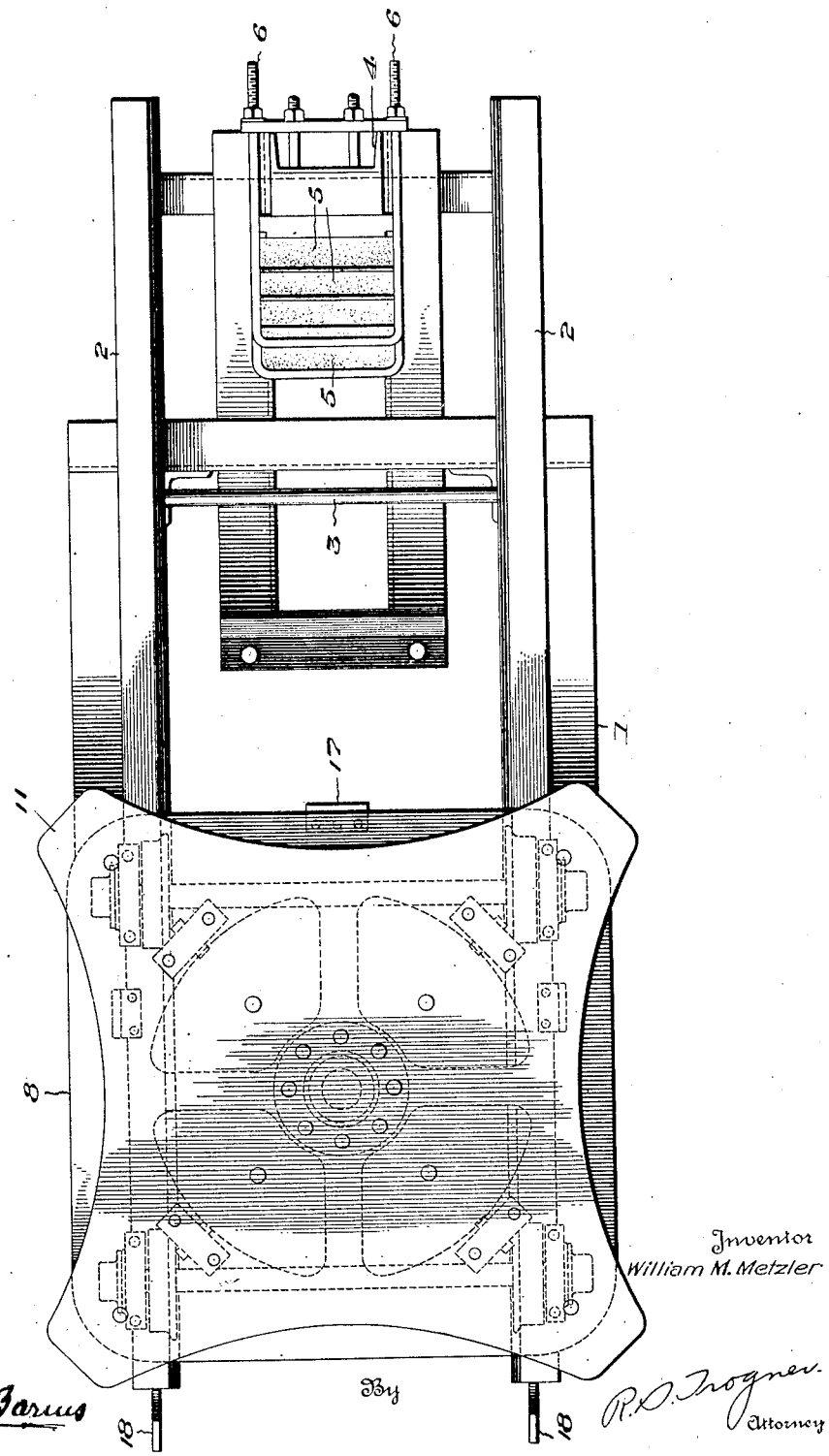
Figure 2:
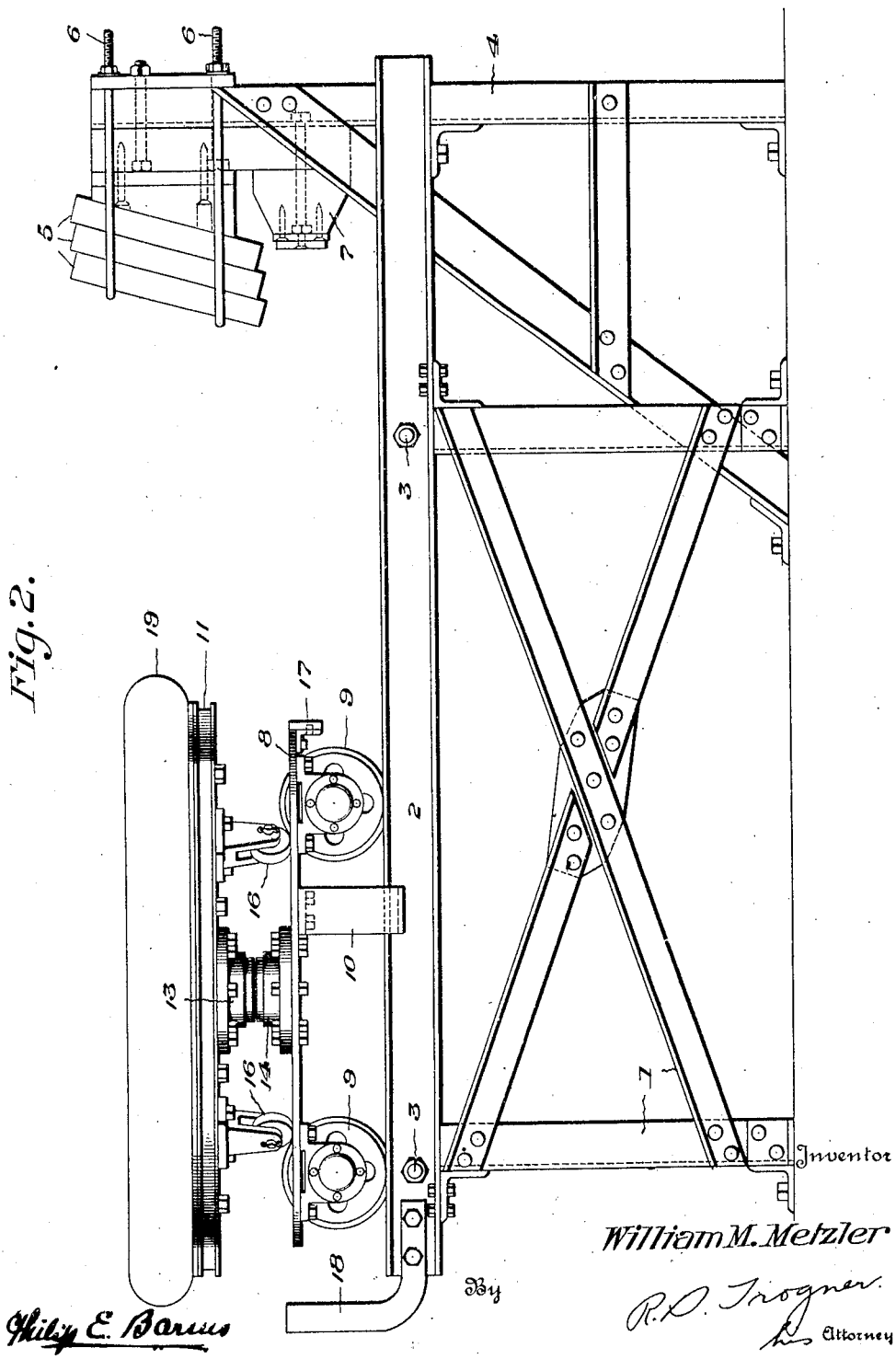
Fig. 2 is a side elevation of the device shown in Fig. 1.

The cores, upon which pneumatic casings are ordinarily formed, are made of several segments which are bolted together and are removed from the tire carcass after it has been formed. The tire carcass, however, possesses a certain rigidity of form, and the core segments are ordinarily relatively heavy, which causes some difficulty in removing the core from the finished carcass.

In practising my invention, I provide a device for loosening the core in the tire carcass so that it may be easily removed therefrom by employing a movable carriage upon which the tire with its core may be disposed. The carriage is provided with a plurality of wheels adapted to run upon a track suitably supported upon a frame. At one end of the frame a bumper post is secured which carries a shock-receiving member which makes percussive engagement with the tire and loosens the core within the casing. This is accomplished by imparting a forward movement to the carriage upon which the casing is disposed and causing the tire to suddenly engage the shock-receiving member carried by the bumper post. The smaller segments of the core member are preferably loosened first and removed, which materially facilitates removing the larger segments of the core thereafter.

In order to insure a clear understanding of my invention, reference may be had to the drawings in which is shown a core stripper comprising a supporting frame 1, upon which is mounted a plurality of rails 2 connected by tie rods 3. A bumper post 4 is rigidly secured to one end of the frame 1 upon which a plurality of yieldable shock-receiving members 5 are secured by means of U-bolts 6, or in any other suitable manner. An additional shock-receiving member 7 is mounted upon the bumper post 4 directly beneath the yieldable members 5, for the purpose hereinafter set forth.

A carriage or truck is constructed for receiving a tire carcass and its core comprising a table member 8 mounted upon wheels 9 adapted to ride upon the rails 2. A plurality of L-shaped arms 10 are secured at opposite sides of the table member 8 with their bent arms extending beneath the flanges of the rail, thereby preventing any chance of the table becoming dislodged from the track by an unbalanced weight being suddenly imposed upon the truck. A table or platform member 11 is rotatably mounted upon the table member 8 by employing a shaft 12 and a plurality of collars 13 and 14 secured to the member 11 and the member 8 respectively. The collars are provided with grooved faces into which ball-bearings 15 are disposed to permit of rotating the member 11, which is maintained in proper position by the shaft 12. Additional supporting means is provided for the platform 11 by securing thereto a plurality of wheels 16 adapted to ride upon the member 8.

Figure 3:
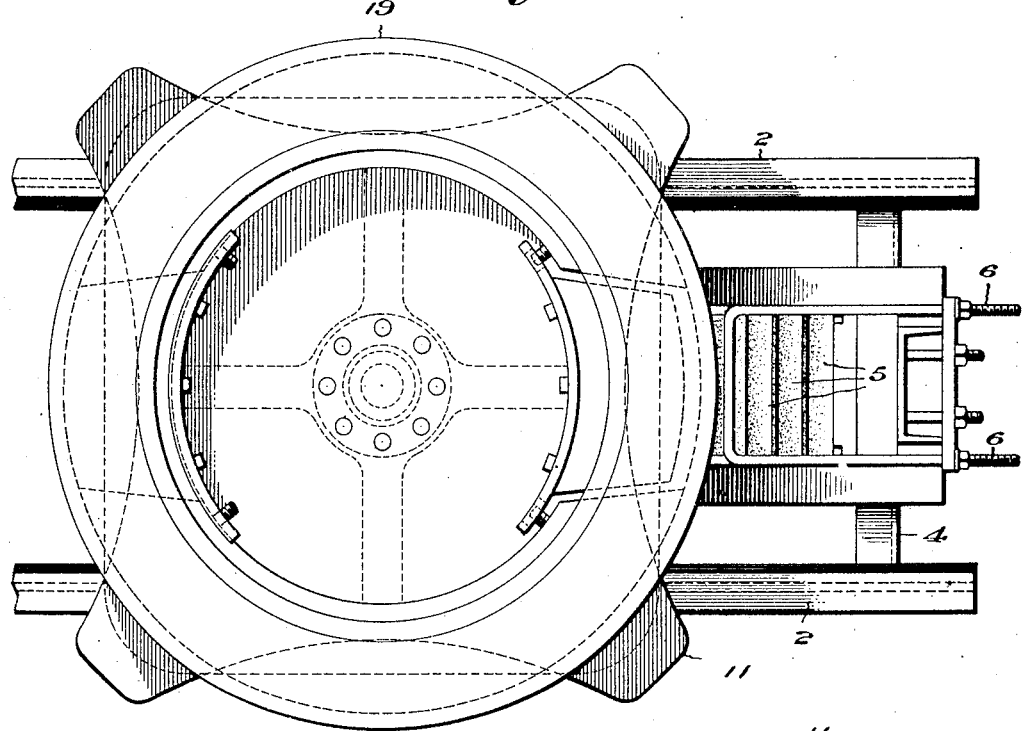
Fig. 3 is a plan view illustrating the position of a movable carriage upon which the tire is disposed, with a segment of the core loosened from its position in the casing.
Figure 4:
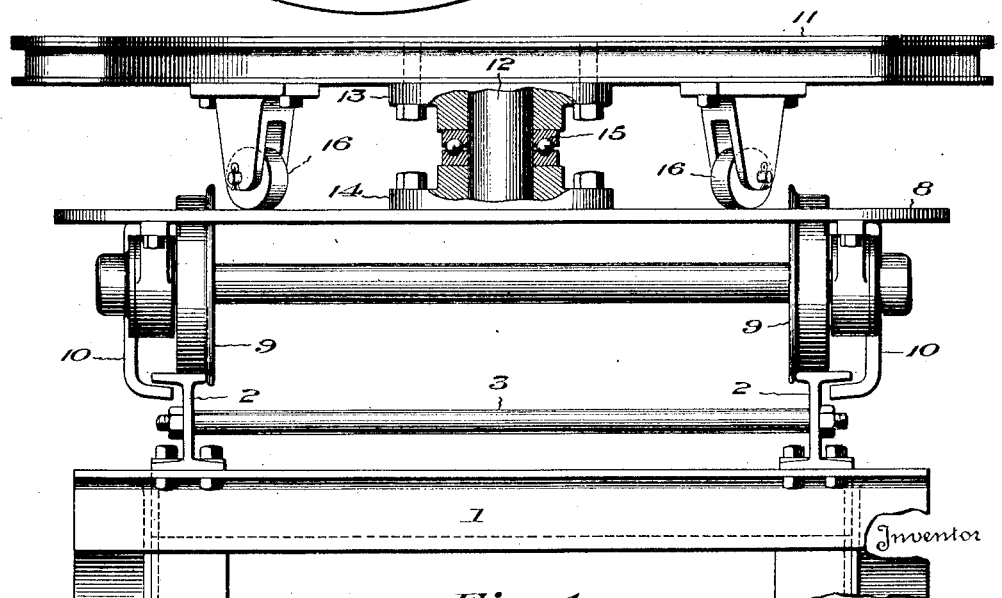
Fig. 4 is an end view, partially in elevation and partially in section, illustrating details of construction of the device shown in the preceding figures.

The platform 11 receives the tire carcass and its core, as clearly shown in Fig. 3. The platform is preferably of such shape as to permit of disposing the tire in a central position upon the platform with a portion of its circumference extending therefrom so as to make engagement with the bumper post without interference from the member 11. The lower shock-receiving member 7 secured to the bumper post 4 is adapted to coöperate with an impact member 17 secured to the table 8. In case the tire and its core are pushed back on the platform 11 when it engages the members 5, the impact member 17 engages the member 7 and stops the truck. A plurality of arms 18 are mounted upon the ends of the rails 2 to prevent the truck from leaving the tracks at the end opposite the bumper post.

In operating the above described device, a tire carcass 19 and its core are placed upon the member 11, as shown in Fig. 3. The truck is started from a position at the end of the tracks opposite the bumper posts and given a forward impetus to cause the tire 14 to make percussive engagement with the yieldable members 5. As above mentioned, the segments of the core are bolted together preparatory to building a tire carcass thereon, and such fastening bolts are removed to permit relative movement of the segments. The member 11 is preferably rotated to bring the core into a position such that the smaller segments thereof shall be in line with the bumper post. When the tire makes engagement with the yieldable members 5, the core segment is at least in part jolted from the tire casing, thus facilitating its entire removal therefrom. The other small segment of the core may then be removed from the core in the same manner, after which the larger segments are removed by repetition of the above described procedure.

Although I have shown and specifically described a core stripper constructed in accordance with my invention, it is obvious that minor changes may be made in the construction thereof without departing from the spirit and scope of my invention, and I desire, therefore, that no limitations shall be imposed except such as are indicated in the appended claims.

What I claim is:

1. A core stripper comprising a movable supporting member for the core, and a bumper post coöperating therewith.

2. A core stripper comprising a movable truck adapted to be rotated, a track therefor, and a bumper post coöperating therewith.

3. A core stripper comprising a movable truck adapted to be rotated, a track therefor, means for limiting the movement of the truck on the track, and a bumper post coöperating with the truck.

4. A core stripper comprising a movable truck adapted to be rotated, a track therefor, means for limiting the movement of the truck on the track, a bumper post coöperating with the truck, and a yieldable shock-receiving member secured to the post.

5. A core stripper comprising a movable carriage adapted to be rotated, a track therefor, means for maintaining the carriage upon the track, a bumper post coöperating with the carriage, and a yieldable shock-receiving member secured to the post.

6. A core stripper comprising a supporting frame, a track mounted thereon, a table mounted upon wheels adapted to ride upon the track, a platform rotatably mounted upon the table, a rigid bumper post secured to one end of the supporting frame, and a yieldable shock-receiving member secured to the post.

7. A core stripper comprising a supporting frame, a track mounted thereon, a table mounted upon wheels adapted to ride upon the track, a platform rotatably mounted upon the table, a rigid bumper post secured to one end of the supporting frame, a yieldable shock-receiving member secured to the post, and a plurality of arms mounted upon the frame opposite the bumper post to prevent the table from leaving the track.

In witness whereof, I have hereunto signed my name in the presence of two subscribing witnesses.

WILLIAM M. METZLER.

Witnesses:
J. E. KEATING,
L. M. HARTMAN.